(12) United States Patent
Ha et al.

(10) Patent No.: US 10,036,845 B2
(45) Date of Patent: Jul. 31, 2018

(54) CURVED DISPLAY DEVICE AND METHOD OF MANUFACTURING THE SAME

(71) Applicant: Samsung Display Co., Ltd., Yongin-Si, Gyeonggi-Do (KR)

(72) Inventors: Juhwa Ha, Asan-si (KR); Taeyong Ryu, Gimcheon-si (KR); Jaesuk Yoo, Seoul (KR); Sangwon Lee, Seoul (KR); Sijoon Song, Suwon-si (KR); Sangho Hwang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 6 days.

(21) Appl. No.: 15/046,733

(22) Filed: Feb. 18, 2016

(65) Prior Publication Data

US 2016/0363715 A1    Dec. 15, 2016

(30) Foreign Application Priority Data

Jun. 12, 2015 (KR) ........................ 10-2015-0083559

(51) Int. Cl.
*F21V 7/04* (2006.01)
*F21V 8/00* (2006.01)
(Continued)

(52) U.S. Cl.
CPC ......... *G02B 6/0058* (2013.01); *G02B 6/0036* (2013.01); *G02B 6/0046* (2013.01);
(Continued)

(58) Field of Classification Search
CPC .. G02B 6/0058; G02B 6/0036; G02B 6/0046; G02B 6/0065; G02F 1/1336; G02F 1/133615
See application file for complete search history.

(56) References Cited

U.S. PATENT DOCUMENTS 7,001,058 B2 * 2/2006 Inditsky ............... G02B 6/0021
362/330
8,292,480 B2 * 10/2012 Koizumi et al. ..... B60Q 1/0058
362/511
(Continued)

FOREIGN PATENT DOCUMENTS

EP    2489928 A1    8/2012
JP    2011-146176 A    7/2011
(Continued)

OTHER PUBLICATIONS

European Search Report for European Patent Application No. 16173271.4 dated Sep. 1, 2016.

*Primary Examiner* — Y M. Lee
(74) *Attorney, Agent, or Firm* — Cantor Colburn LLP

(57) ABSTRACT

A curved display device includes a backlight unit which generates light and a display panel which receives the generated light from the backlight unit. The backlight unit includes a light guide plate and is curved. The display panel is disposed on the curved backlight unit and is curved. The curved light guide plate defines a light incident surface thereof and an opposite surface. The light incident surface receives the light generated by the curved backlight unit. The opposite surface faces the light incident surface. A thickness of the curved light guide plate decreases from the light incident surface to the opposite surface.

24 Claims, 12 Drawing Sheets

(51) Int. Cl.
  *G02F 1/13357*  (2006.01)
  *G02F 1/1335*  (2006.01)
(52) U.S. Cl.
  CPC ......... *G02B 6/0065* (2013.01); *G02F 1/1336*
    (2013.01); *G02F 1/133615* (2013.01)

(56) References Cited

U.S. PATENT DOCUMENTS

| | | | | |
|---|---|---|---|---|
| 2009/0251917 | A1* | 10/2009 | Wollner et al. | F21S 48/2243 |
| | | | | 362/543 |
| 2010/0289983 | A1* | 11/2010 | Rocard et al. | B29D 11/0074 |
| | | | | 362/97.1 |
| 2010/0328568 | A1* | 12/2010 | Lee et al. | G02F 1/133308 |
| | | | | 349/58 |
| 2014/0307474 | A1 | 10/2014 | Kim et al. | |
| 2015/0378188 | A1* | 12/2015 | Moon et al. | G02F 1/1333 |
| | | | | 362/606 |

FOREIGN PATENT DOCUMENTS

| | | | |
|---|---|---|---|
| KR | 1020080046313 | A | 5/2008 |
| KR | 1020090103731 | A | 10/2009 |
| KR | 10-1083887 | A | 11/2011 |
| KR | 10-1094923 | B1 | 12/2011 |
| KR | 1020120085378 | A | 8/2012 |
| KR | 1020120130919 | A | 12/2012 |
| KR | 1020130051130 | A | 5/2013 |
| KR | 10-1325289 | A | 10/2013 |
| KR | 1020140060078 | A | 5/2014 |
| KR | 10-1429486 | B1 | 8/2014 |

\* cited by examiner

CURVED DISPLAY DEVICE AND METHOD OF MANUFACTURING THE SAME

This application claims priority to Korean Patent Application No. 10-2015-0083559, filed on Jun. 12, 2015, and all the benefits accruing therefrom under 35 U.S.C. § 119, the contents of which are hereby incorporated by reference in its entirety.

BACKGROUND

1. Field

The invention relates to a curved display device and a method of manufacturing the same. More particularly, the invention relates to a curved display device which has a slim structure and a method of manufacturing the curved display device.

2. Description of the Related Art

A flat panel display device is applied to various types of information processing devices, such as a television set, a display monitor, a notebook computer, a mobile phone, etc., to display an image. A curved display device with a curved shape has been developed. The curved display device provides a user with a display area having a curved display surface to increase three-dimensional effect, sense of immersion (or immersiveness), presence of the image, etc.

SUMMARY

One or more exemplary embodiment provides a curved display device capable of being slimmed.

One or more exemplary embodiment provides a method of manufacturing the curved display device capable of being slimmed.

An exemplary embodiment provides a curved display device including a backlight unit and a display panel. The backlight unit includes a curved light guide plate and is curved. The display panel is disposed on the curved backlight unit and is curved. The curved light guide plate defines a light incident surface thereof and an opposite surface thereof. The light incident surface receives the light generated by the curved backlight unit. The opposite surface faces the light incident surface. A thickness of the curved light guide plate decreases from the light incident surface to the opposite surface.

The thickness of the curved light guide plate may uniformly decrease from the light incident surface to the opposite surface.

The curved light guide plate may further define a first side surface thereof and a second side surface thereof. The first side surface connects the light incident surface and the opposite surface to each other. The second side surface is spaced apart from the first side surface and connects the light incident surface and the opposite surface to each other. Each of the first side surface and the second side surface may have a trapezoid shape.

Each of the first side surface and the second side surface may be defined by straight line edges thereof.

The first side surface may have a same surface area as that of the second side surface.

Each of the light incident surface and the opposite surface may be defined by straight line edges and curved line edges thereof.

The curved light incident surface may have a surface area greater than that of the opposite surface.

The curved light guide plate may further define a light exit surface thereof and a rear surface thereof. The light incident to the light guide plate exits from the light exit surface. The rear surface faces the light exit surface. A distance between the light exit surface and the light guide rear surface decreases from the light incident surface to the opposite surface.

An angle between the light exit surface and the rear surface may be in a range from about 0.1 degree to about 0.3 degree.

At least one of the light exit surface and the rear surface may have a lenticular shape or a prism shape.

The curved light guide plate may include a light scattering agent.

The curved display panel may have a first radius of curvature and the curved backlight unit may have a second radius of curvature different from the first radius of curvature.

The curved display device may further include a curved bottom chassis. The curved bottom chassis may hold the curved backlight unit and the curved display panel and include a metal or a metal alloy.

The curved display device may further include a printed circuit board and a tape carrier package. The printed circuit board is electrically connected to the curved display panel. The tape carrier package connects the curved display panel and the printed circuit board to each other.

The curved display device may further include a top chassis which covers at least one side surface of the curved display panel.

The printed circuit board may be disposed on a lower surface of the curved bottom chassis and the top chassis may overlap a portion of the tape carrier package connected to the printed circuit board.

The top chassis may be disposed adjacent to the light incident surface of the curved light guide plate.

The curved display device may further include a set frame which covers the printed circuit board and overlaps a portion of the curved bottom chassis.

The set frame may be disposed adjacent to the light incident surface of the light guide plate.

The curved bottom chassis may define a bracket which protrudes from a lower surface of the curved bottom chassis. The bracket may reinforce rigidity of the curved bottom chassis and be spaced apart from the set frame.

An exemplary embodiment of the invention provides a method of manufacturing a curved display device, including preparing a curved backlight unit and providing a curved display panel on the curved backlight unit. The preparing the backlight unit includes preparing a curved light guide plate which defines a light incident surface thereof and an opposite surface thereof which opposes the light incident surface. A thickness of the curved light guide plate decreases from the light incident surface to the opposite surface.

The curved light guide plate may be manufactured by an extrusion or injection molding process.

An exemplary embodiment of the invention provides a curved display device including a backlight unit which generates light and a display panel which receives the light generated by the backlight unit. The backlight unit includes a light guide plate and is curved. The display panel is disposed on the backlight unit and is curved. The light guide plate has a curved wedge shape.

According to the above, an overall thickness of the curved display device is easily reduced. In addition, a manufacturing method of a curved display device easily reduces an overall thickness of the curved display device manufactured thereby.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1A:
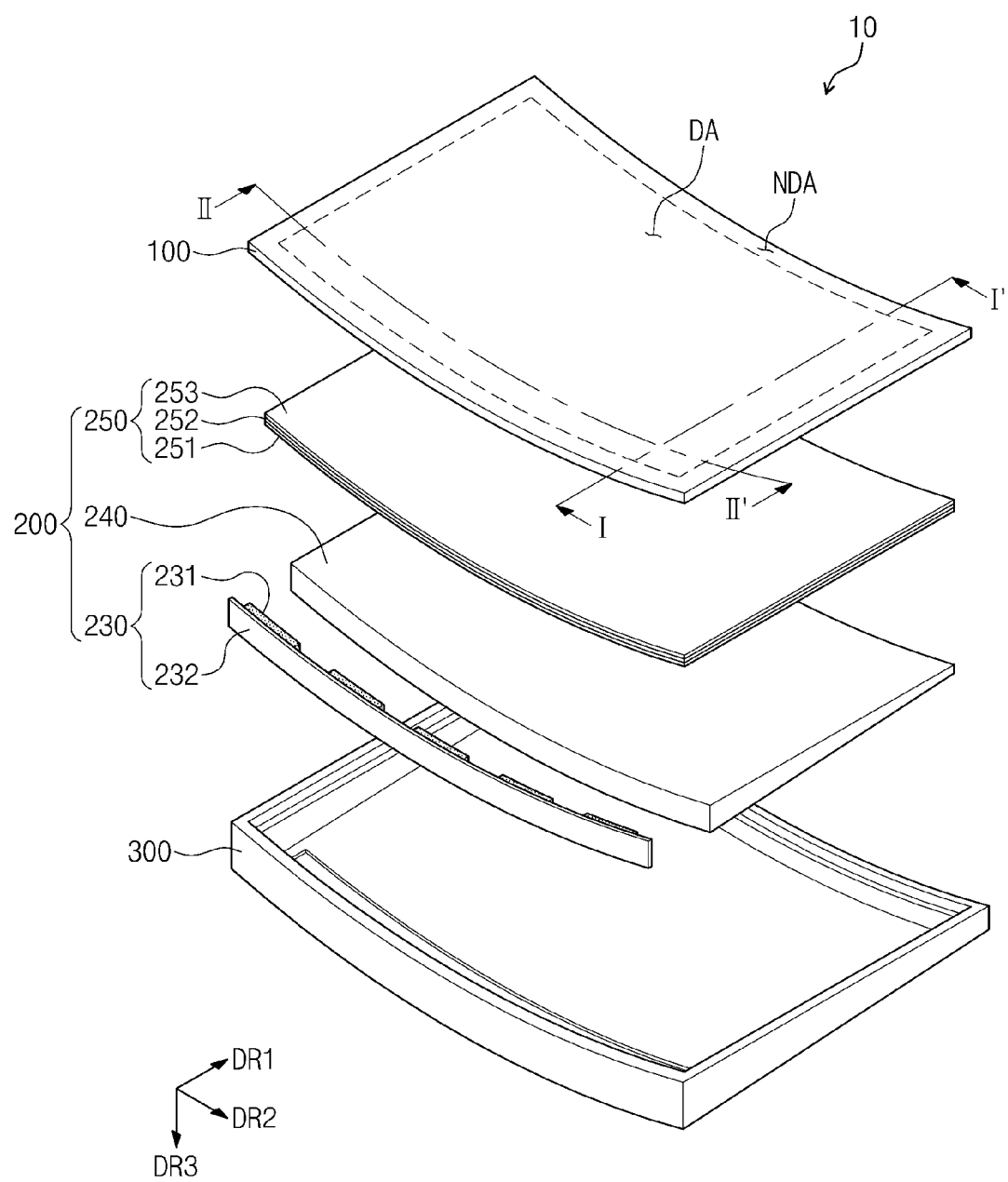
FIG. 1A is an exploded perspective view showing an exemplary embodiment of a curved display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1B:
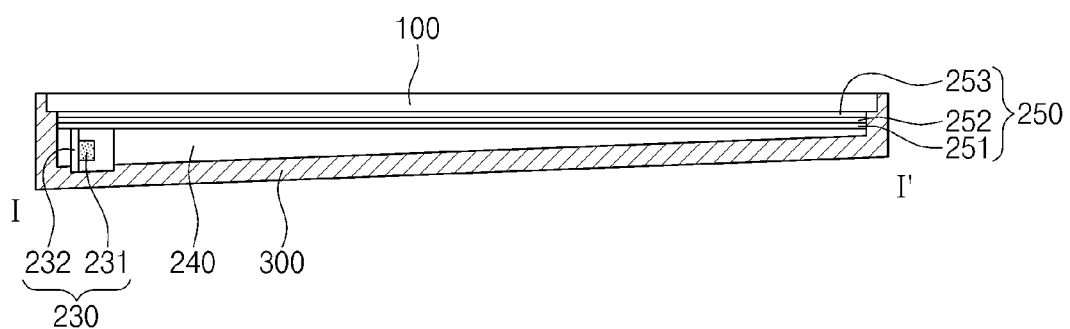
FIG. 1B is a cross-sectional view taken along line I-I' of FIG. 1A.
Figure 1C:
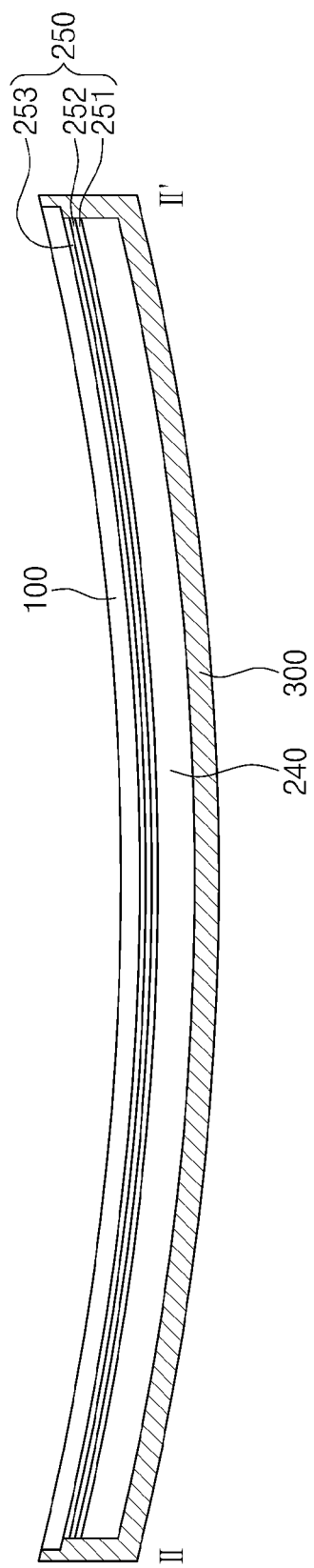
FIG. 1C is a cross-sectional view taken along line II-II' of FIG. 1A.

FIG. 1A is an exploded perspective view showing an exemplary embodiment of a curved display device 10 according to the invention, FIG. 1B is a cross-sectional view taken along line I-I' of FIG. 1A, and FIG. 1C is a cross-sectional view taken along line II-II' of FIG. 1A.

Referring to FIGS. 1A to 1C, the curved display device 10 includes a display panel 100 and a backlight unit 200.

The display panel 100 is disposed on the backlight unit 200. The display panel 100 receives a light and displays an image. The display panel 100 is a non-self emissive display panel, such as a liquid crystal display panel, a plasma display panel, an electrophoretic display panel, a microelectromechanical system ("MEMS") display panel, an electrowetting display panel, etc. In the exemplary embodiment, the liquid crystal display panel will be described as the display panel 100.

The liquid crystal display panel may be a vertical alignment ("VA") mode display panel, a patterned vertical alignment ("PVA") mode display panel, an in-plane switching ("IPS") mode display panel, a fringe-field switching ("FFS") mode display panel, or a plane-to-line switching ("PLS") mode display panel.

The display panel 100 includes a display area DA in which the image is displayed and a non-display area NDA in which the image is not displayed. The display area DA displays the image. When viewed in a thickness direction DR3 of the curved display device 10, the display area DA has a substantially rectangular planar shape, but should not be limited to the rectangular shape.

The display area DA includes a plurality of pixel areas defined therein (not shown). The pixel areas (not shown) are arranged in a matrix form. The pixel areas (not shown) include a plurality of pixels (not shown) defined therein, respectively.

The non-display area NDA does not display the image. When viewed in the thickness direction DR3 of the curved display device 10, the non-display area NDA is disposed to surround the display area DA. The non-display area NDA is disposed adjacent to the display area DA in a first direction DR1 and in a second direction DR2 substantially perpendicular to the first direction DR1.

Figure 2A:
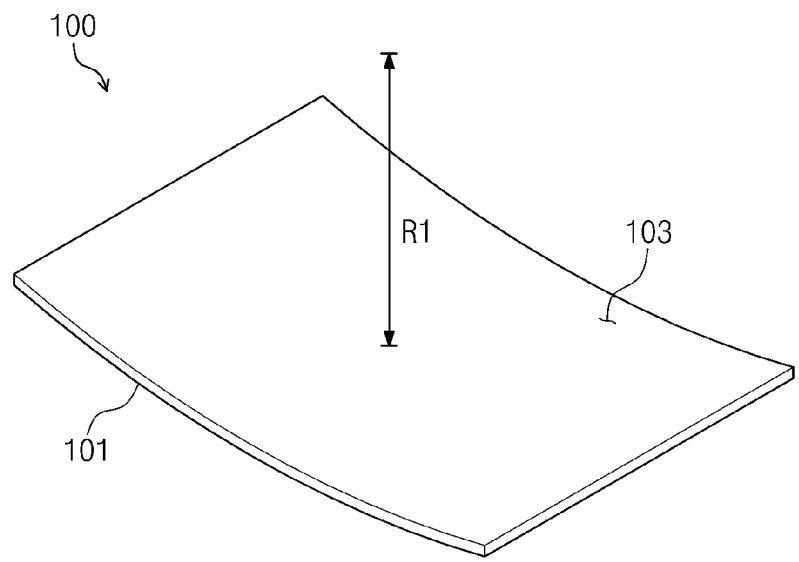
FIG. 2A is a perspective view showing an exemplary embodiment of a display panel included in a curved display device according to the invention.

FIG. 2A is a perspective view showing an exemplary embodiment of a display panel 100 included in a curved display device according to the invention.

Referring to FIGS. 1A to 1C and 2A, the display panel 100 may be curved. The display panel 100 has a first radius of curvature R1. In an exemplary embodiment, for instance, a curved display surface 103 defined by the display panel 100 has the first radius of curvature R1. However, when viewed from a rear surface 101 which opposes the curved display surface 103, the rear surface 101 may have the first radius of curvature R1 where the display panel 100 is convex curved.

The first radius of curvature R1 is in a range from about 2000 millimeters (mm) to about 5000 mm. When the first radius of curvature R1 is smaller than about 2000 mm, a user effectively recognizing the image displayed on the display panel 100 may be difficult. When the first radius of curvature R1 is greater than about 5000 mm, a three-dimensional effect, sense of immersion (or immersiveness) and presence of the image displayed on the display panel 100 are deteriorated.

FIG. 1A shows the display panel 100 has a concave shape when viewed in the thickness direction DR3 of the curved display device 10, but the display panel 100 should not be limited to the concave shape. That is, the display panel 100 may have a convex shape when viewed in the thickness direction DR3 of the curved display device 10.

Figure 2B:
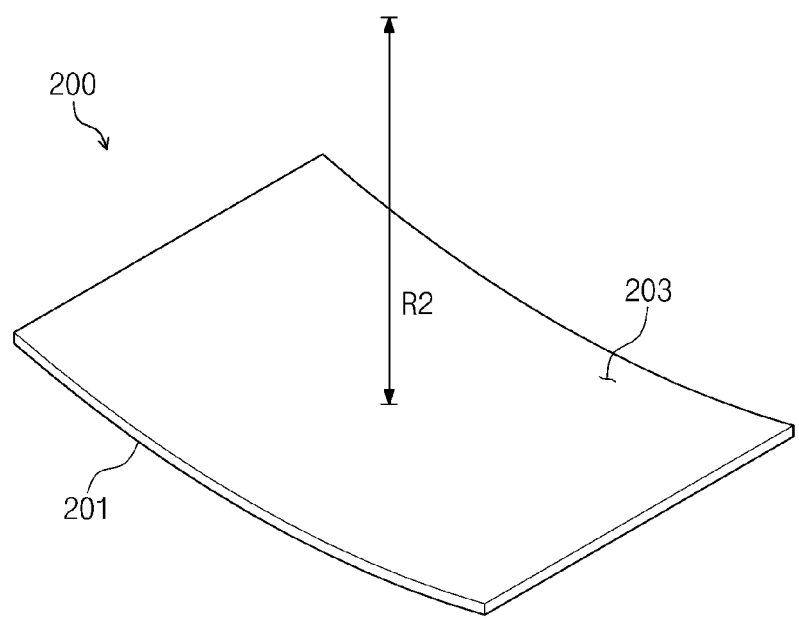
FIG. 2B is a perspective view showing an exemplary embodiment of a backlight unit included in a curved display device according to the invention.

FIG. 2B is a perspective view showing an exemplary embodiment of a backlight unit 200 included in a curved display device according to the invention.

Referring to FIGS. 1A to 1C, 2A, and 2B, the backlight unit 200 generates and provides the display panel 100 with the light. The backlight unit 200 may be curved. The backlight unit 200 has a second radius of curvature R2. In an exemplary embodiment, for instance, a curved upper surface 203 included in the backlight unit 200 has the second radius of curvature R2. The curved upper surface 203 corresponds to an upper surface of an element disposed closest to the display panel 100 among elements included in the backlight unit 200. The second radius of curvature R2 is greater than the first radius of curvature R1. However, where the backlight unit 200 is convexly curved when viewed from the upper surface 203 to a lower surface 201, the lower surface 201 has the second radius of curvature R2. Where the backlight unit 200 is convexly curved when viewed from the upper surface 203 to the lower surface 20, the second radius of curvature R2 is smaller than the first radius of curvature R1.

The backlight unit 200 includes a light guide plate 240. The backlight unit 200 further includes a light source unit 230 which generates the light and an optical member 250 which is disposed on the light source unit 230.

The light guide plate 240 is provided under the display panel 100. The light guide plate 240 is curved. The light guide plate 240 guides the light generated and provided from the light source unit 230. The light guide plate 240 guides the light provided from the light source unit 230 to the display panel 100. The light incident into the light guide plate 240 travels to the display panel 100 through a light exit surface 246 (refer to FIG. 3A) of the light guide plate 240.

The light guide plate 240 includes a transparent polymer resin, e.g., polycarbonate, polymethyl methacrylate, etc., but should not be limited thereto or thereby. The light guide plate 240 will be described in detail later.

The light source unit 230 may be curved. The light source unit 230 includes at least one light source 231 and a circuit board 232 which applies a power source voltage to the light source 231. The light source 231 is mounted on the circuit board 232. The light source 231 may be, but is not limited to, a light emitting diode. The circuit board 232 has a substantially square shape when viewed in the thickness direction DR3 of the curved display device 10. The light source 231 may be provided in a plural number and the plural light sources 231 are disposed arranged on the circuit board 232 along the second direction DR2 and spaced apart from each other. The light source 231 and the circuit board 232 may be curved.

In the exemplary embodiment, the light source unit 230 is disposed to correspond to one side surface among side surfaces of the light guide plate 240, but should not be limited thereto or thereby. That is, the light source units 230 may be disposed on plural side surfaces of the light guide plate 240. In the exemplary embodiment, the curved display device 10 includes an edge-illumination type light source unit 230, but should not be limited thereto or thereby. That is, the curved display device 10 may include a direct-illumination type light source unit.

The optical member 250 is disposed between the display panel 100 and the light guide plate 240. The optical member 250 may be curved. The optical member 250 improves a brightness and a viewing angle of the light which has exited through the light exit surface of the light guide plate 240.

The optical member 250 includes a first optical sheet 251, a second optical sheet 252 and a third optical sheet 253, which are sequentially stacked one on another. Each of the first, second and third optical sheets 251, 252 and 253 may be curved.

The first optical sheet 251 may be a diffusion sheet which diffuses the light exited from the light guide plate 240. The second optical sheet 252 may be a prism sheet which condenses the light diffused by the diffusion sheet in a direction substantially vertical to a plane surface of the display panel 100. The third optical sheet 253 may be a prism sheet which protects the prism sheet from external impacts thereto. In the optical member 250, at least one sheet among the first, second and third optical sheets 251, 252 and 253 is provided in a plural number, and if necessary, one or more sheets among the optical member 250 may be omitted.

Although not shown in figures, the backlight unit 200 may further include a reflective sheet. The reflective sheet is provided under the light guide plate 240. The reflective sheet may be curved. The reflective sheet reflects the light leaking from the light guide plate 240 and not directed to the display panel 100 to allow the light leaking from the light guide plate 240 to travel to the display panel 100. Accordingly, an amount of the light provided to the display panel 100 increases by the reflective sheet.

Figure 2C:
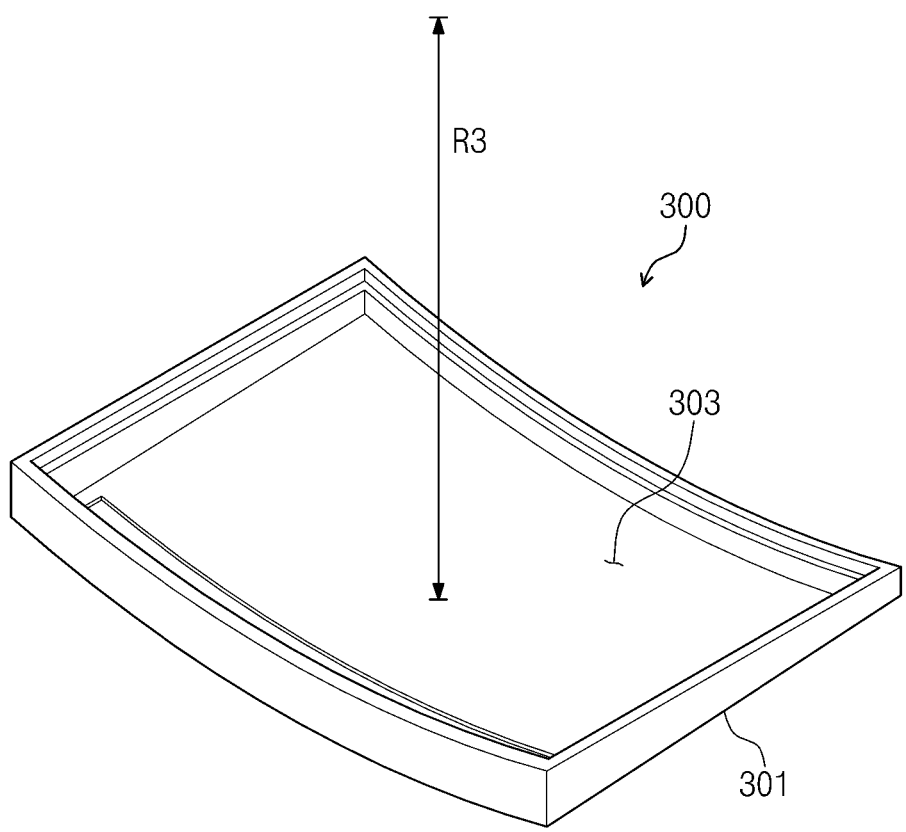
FIG. 2C is a perspective view showing an exemplary embodiment of a bottom chassis included in a curved display device according to the invention.

FIG. 2C is a perspective view showing an exemplary embodiment of a bottom chassis 300 included in a curved display device according to the invention.

Referring to FIGS. 1A to 1C and 2A to 2C, the bottom chassis 300 holds the backlight unit 200 and the display panel 100 within the curved display device 10.

The bottom chassis 300 may be curved. The bottom chassis 300 has a third radius of curvature R3. In an exemplary embodiment, for instance, an upper surface 303 included in the bottom chassis 300 has the third radius of curvature R3. The third radius of curvature R3 is greater than each of the first and second radius of curvatures R1 and R2. However, where the bottom chassis 300 is convexly curved when viewed from the upper surface 303 to a lower surface 301, the lower surface 301 has the third radius of curvature R3. Where the bottom chassis 300 is convexly curved when viewed from the upper surface 303 to the lower surface 301, the third radius of curvature R3 may be smaller than each of the first and second radius of curvatures R1 and R2.

The bottom chassis 300 includes a metal or a metal alloy. In an exemplary embodiment, for instance, the bottom chassis 300 includes one or aluminum, gold, silver and iron. Therefore, the bottom chassis 300 not only holds the display panel 100 within the curved display device 10 but also discharges heat generated from the display panel 100 to outside the curved display device 10. Where the curved display device 10 does not include a mold frame as a separate element from the bottom chassis 300, the bottom chassis 300 may serve as the mold frame.

The bottom chassis 300 may have a non-constant thickness in the thickness direction DR3. In an exemplary embodiment, for instance, a thickness of a portion of the bottom chassis 300 which is disposed adjacent to a light incident surface 241 (refer to FIG. 3A) of the light guide plate 240, may be greater than a thickness of a portion of the bottom chassis 300 which is disposed adjacent to an opposite surface 242 (refer to FIG. 3A) of the light guide plate 240. The thickness of the bottom chassis 300 is uniformly reduced as a distance to the portion of the bottom chassis 300 which is disposed adjacent to an opposite surface 242 (refer to FIG. 3A) of the light guide plate 240 from the light incident surface thereof decreases.

Although not shown in figures, the bottom chassis 300 includes a light source unit accommodating part, an optical member accommodating part and a display panel accommodating part. The light source unit accommodating part accommodates the light source unit 230. The light source unit accommodating part is connected to the optical member accommodating part. The optical member accommodating part is disposed on the optical unit accommodating part. The optical member accommodating part is disposed between the light source unit accommodating part and the display panel accommodating part. The optical member accommodating part is connected to the light source unit accommodating part. The optical member accommodating part is connected to the display panel accommodating part. The optical member accommodating part accommodates the optical member 250 and supports the display panel 100. The display panel accommodating part is disposed on the optical member accommodating part to accommodate the display panel 100.

The light source unit accommodating part, the optical member accommodating part and the display panel accommodating part of the bottom chassis 300 may be integrally formed with each other. The bottom chassis 300 may define the upper surface 303, the lower surface 301, the light source unit accommodating part, the optical member accommodating part and the display panel accommodating part thereof. In an exemplary embodiment of manufacturing a curved display device 10, the light source unit accommodating part, the optical member accommodating part and the display panel accommodating part of the bottom chassis 300 may be manufactured through the same process. In more detail, the light source unit accommodating part, the optical member accommodating part and the display panel accommodating part may be manufactured by a die casting method, but is not limited thereto or thereby.

Although not shown in figures, the curved display device 10 may include a mold frame. The mold frame may be a separate element from the bottom chassis 300. The mold frame is disposed between the display panel 100 and the bottom chassis 300 to reduced or effectively prevent separation of the backlight unit 200 the bottom chassis 300 and to support the display panel 100 thereon.

Figure 3A:
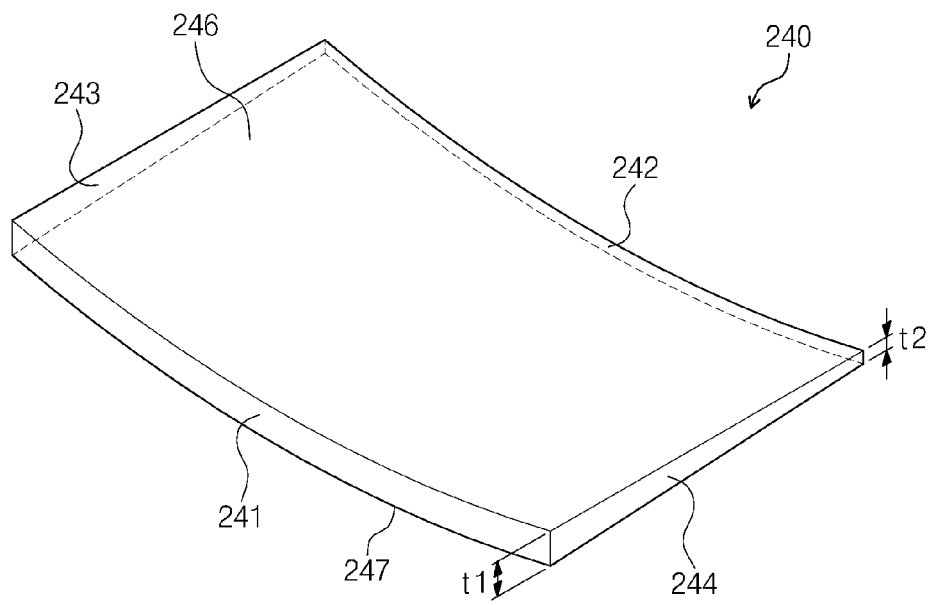
FIG. 3A is a perspective view showing an exemplary embodiment of a light guide plate included in a curved display device according to the invention.
Figure 3B:
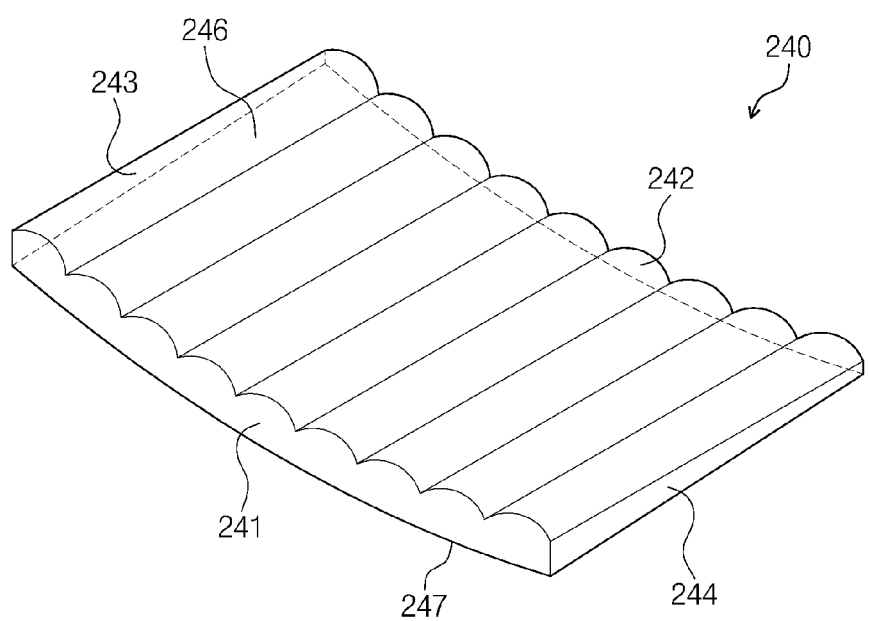
FIG. 3B is a perspective view showing another exemplary embodiment of a light guide plate included in a curved display device according to the invention.
Figure 3C:
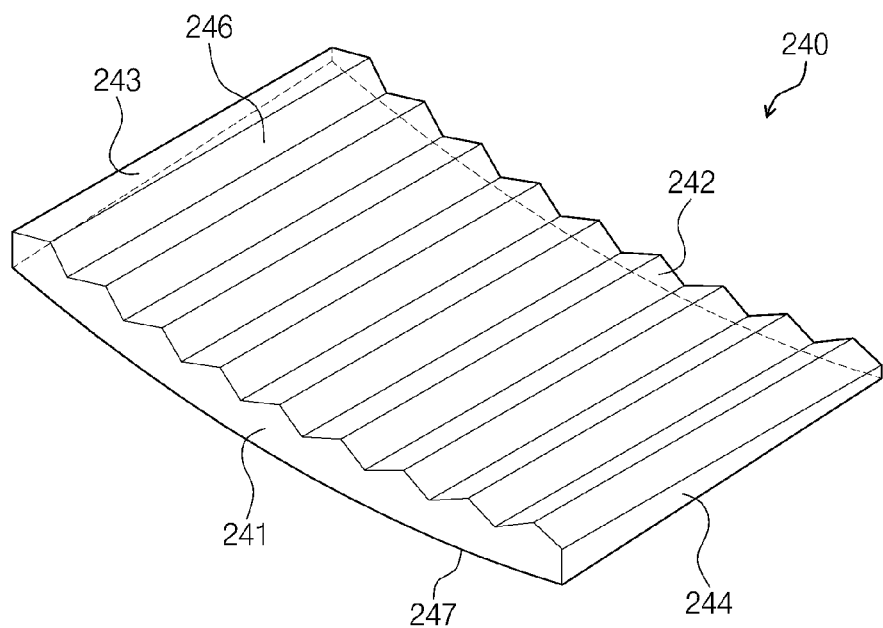
FIG. 3C is a perspective view showing still another exemplary embodiment of a light guide plate included in a curved display device according to the invention.

FIG. 3A is a perspective view showing an exemplary embodiment of a light guide plate included in a curved display device according to the invention, FIG. 3B is a perspective view showing another exemplary embodiment of a light guide plate included in a curved display device according to the invention, and FIG. 3C is a perspective view showing still another exemplary embodiment of a light guide plate included in a curved display device according to the invention.

Referring to FIGS. 1A to 1C and 3A to 3C, the light guide plate 240 includes the light incident surface 241 and the opposite surface 242. The light incident surface 241 receives the light provided from the light source unit 230. The light incident surface 241 is disposed adjacent to the light source unit 230. The opposite surface 242 faces the light incident surface 241. The opposite surface 242 is spaced apart from the light incident surface 241 in the first direction DR1. The light incident surface 241 has a surface area greater than the opposite surface 242.

Each of the light incident surface 241 and the opposite surface 242 may have a curved rectangular shape. In an exemplary embodiment, for instance, each of the light incident surface 241 and the opposite surface 242 may have a shape corresponding to a portion of a ring. In a cross-section of the light guide plate 240, each of the light incident surface 241 and the opposite surface 242 is defined by curved lines and straight lines. That is, each of the light incident surface 241 and the opposite surface 242 is defined by curved line edges thereof and straight line edges thereof. The light guide plate 240 has a first thickness t1 at a portion corresponding to the light incident surface 241 and a second thickness t2 at a portion corresponding to the opposite surface 242. The thickness of the light guide plate 240 becomes smaller in a direction from the light incident surface 241 to the opposite surface 242. In detail, the thickness of the light guide plate 240 uniformly becomes smaller in a direction from the light incident surface 241 to the opposite surface 242 along the first direction DR1.

The light guide plate 240 further includes a first side surface 243 and a second side surface 244. The first side surface 243 connects the light incident surface 241 and the opposite surface 242 to each other. The second side surface 244 faces the first side surface 243. The first side surface 243 has a same surface area as the second side surface 244. The second side surface 244 connects the light incident surface 241 and the opposite surface 242 to each other. The second side surface 244 is spaced apart from the first side surface 243 in the second direction DR2.

Each of the first side surface and second side surface 243 and 244 may have a trapezoid shape in a cross-section of the light guide plate 240. Each of the first side surface and second side surface 243 and 244 may be defined by straight lines. That is, each of the first side surface and second side surface 243 and 244 may be defined by straight line edges thereof.

The light guide plate 240 further includes the light exit surface 246 and a rear surface 247. The light, which is incident into the light guide plate 240, exits through the light exit surface 246. The rear surface 247 faces the light exit surface 246. The rear surface 247 is spaced apart from the light exit surface 246 in a third direction (e.g., the thickness direction DR3). Each of the light exit surface 246 and the rear surface 247 is defined by straight lines in a cross-section of the light guide plate 240. That is, each of the light exit surface 246 and the rear surface 247 may be defined by straight line edges thereof. A distance between the light exit surface 246 and the rear surface 247 (e.g., a thickness of the light guide plate 240) becomes smaller as a distance to the opposite surface 242 from the light incident surface 241 become smaller.

Referring to FIGS. 1A to 1C, 3B and 3C, at least one of the light exit surface 246 and the rear surface 247 has a lenticular shape or a prism shape. The lenticular shape is defined by connecting plural curved surface shapes to each other and the prism shape is defined by connecting plural triangular shapes to each other. The light exit surface 246 and/or the rear surface 247 may include a plurality of lenticular shapes or a plurality of prism shapes. The light exit surface 246 and the rear surface 247, which have the lenticular shape or the prism shape, condense the light exiting through the light exit surface 246 to improve brightness of light exiting therefrom.

In FIG. 3B, the curved surface shapes included in the lenticular shape have substantially the same size, but should not be limited thereto or thereby. That is, at least one of the curved surface shapes included in the lenticular shape may have a different size from that of the other curved surface shapes. In addition, the triangular shapes included in the prism shapes have a uniform size as shown in FIG. 3C, but should not be limited thereto or thereby. That is, at least one of the triangular shapes included in the prism shapes may have a different size from that of the other triangular shapes.

Where at least one of the light exit surface 246 and the rear surface 247 has the lenticular shape or the prism shape, the light may be guided in each of the lenticular shapes and each of the prism shapes when the light is provided to the light guide plate 240. Therefore, power consumption of the display panel 100 may be reduced when the display panel 100 is operated by using a local dimming algorithm.

Figure 3D:
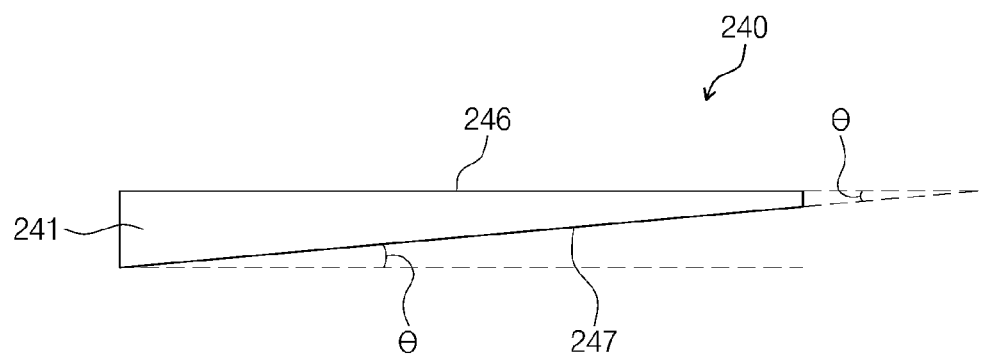
FIG. 3D is a side view showing yet another exemplary embodiment of a light guide plate included in a curved display device according to the invention.

FIG. 3D is a side view showing yet another exemplary embodiment of a light guide plate included in a curved display device according to the invention.

Referring to FIGS. 1A to 1C and 3A to 3D, an angle θ between the light exit surface 246 and the rear surface 247 is in a range from about 0.1 degree to about 0.3 degree. When the angle θ between the light exit surface 246 and the rear surface 247 is smaller than about 0.1 degree, reducing an overall thickness of the curved display device 10 may be difficult, and when the angle θ between the light exit surface 246 and the rear surface 247 exceeds about 0.3 degree, guiding the light incident to the light incident surface 241 to the light exit surface 246 may be difficult.

The light guide plate 240 further includes a scattering agent (not shown). The scattering agent may be a material which scatters light and is disposed in the body of the light guide plate 240. The scattering agent scatters the light incident to the light guide plate 240 to reduce a dark area of the display panel 100. The scattering agent includes at least one gold, silver, aluminum, platinum, palladium, cadmium, cobalt, ruthenium, copper, indium, nickel and iron, and an alloy including at least one metal selected from $TiO_2$, $SiO_2$, $BaSO_4$ and $CaCO_3$.

The body of the light guide plate 240 in which the scattering agent is disposed may be transparent such as including a transparent material. The transparent material includes at least one of polycarbonate ("PC"), polyethylene-terephthalate ("PET"), polyethylene ("PE"), polypropylene ("PP"), polysulfone ("PSF"), polymethylemethacrylate ("PMMA"), triacetylcellulose ("TAC"), cycloolefin polymer ("CPO") and cycloolefin copolymer ("COC").

Figure 4A:
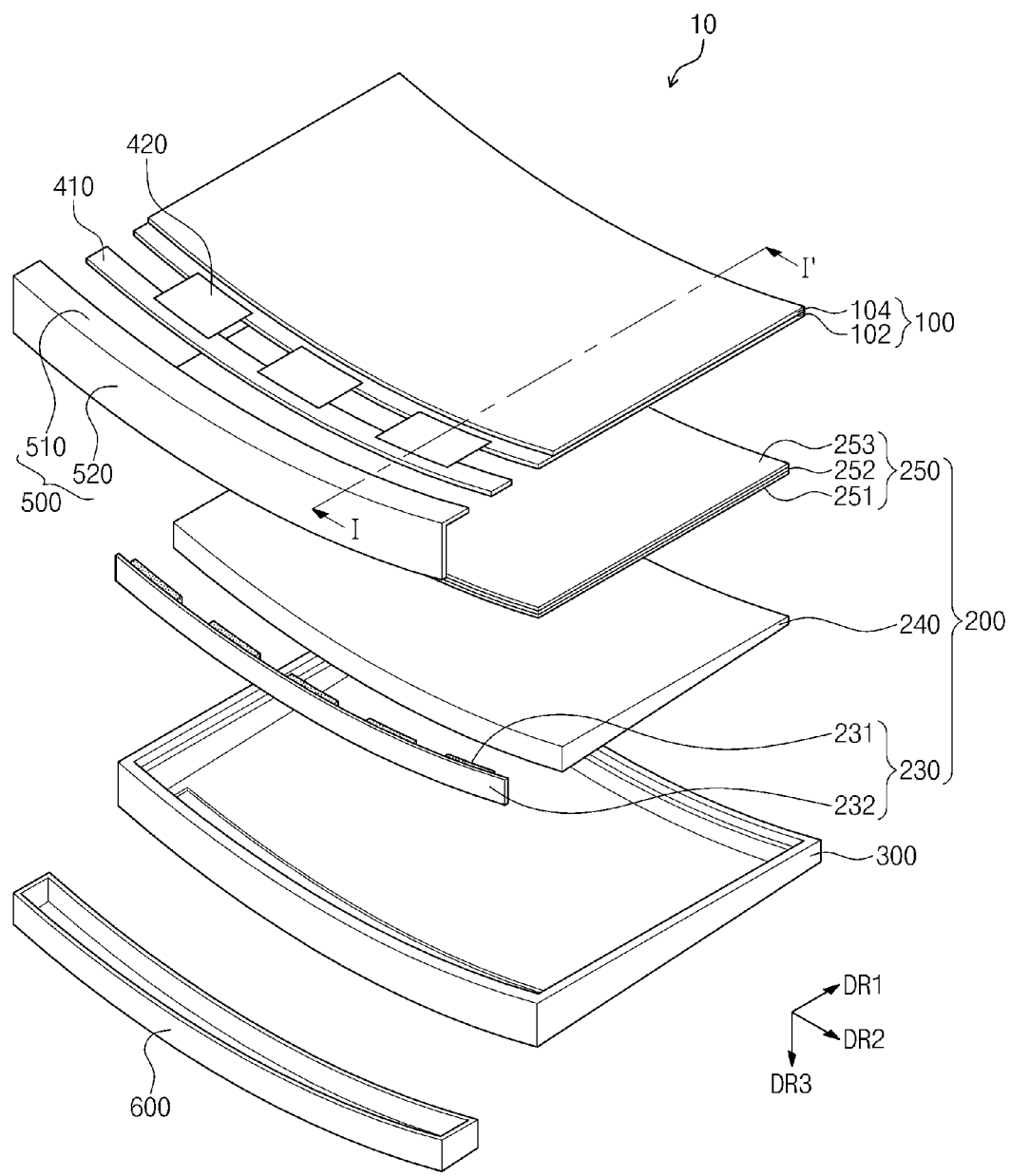
FIG. 4A is an exploded perspective view showing another exemplary embodiment of a curved display device according to the invention.
Figure 4B:
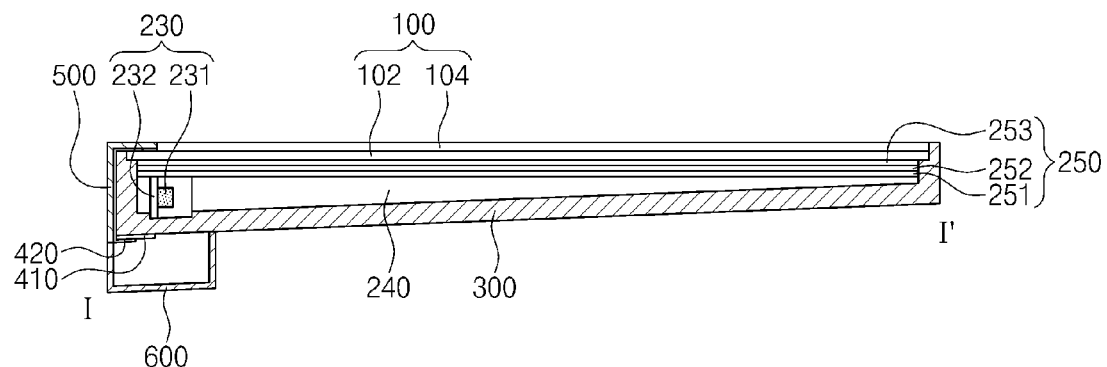
FIG. 4B is a cross-sectional view taken along line I-I' of FIG. 4A.
Figure 4C:
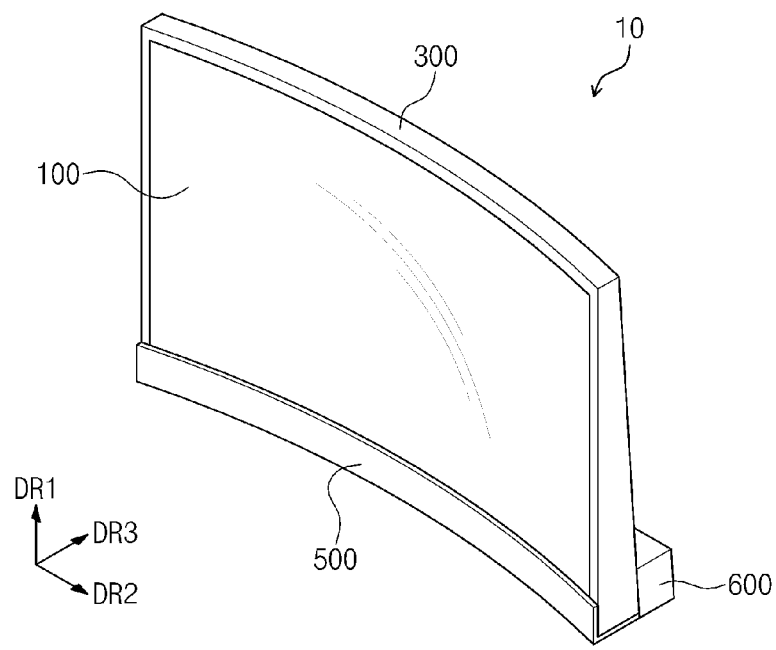
FIG. 4C is a perspective view showing an assembled state of the curved display device in FIGS. 4A and 4B according to the invention.

FIG. 4A is an exploded perspective view showing another exemplary embodiment of a curved display device according to the invention, FIG. 4B is a cross-sectional view taken along line I-I' of FIG. 4A, and FIG. 4C is a perspective view showing an assembled state of the curved display device of FIGS. 4A and 4B according to the invention.

Figure 5A:
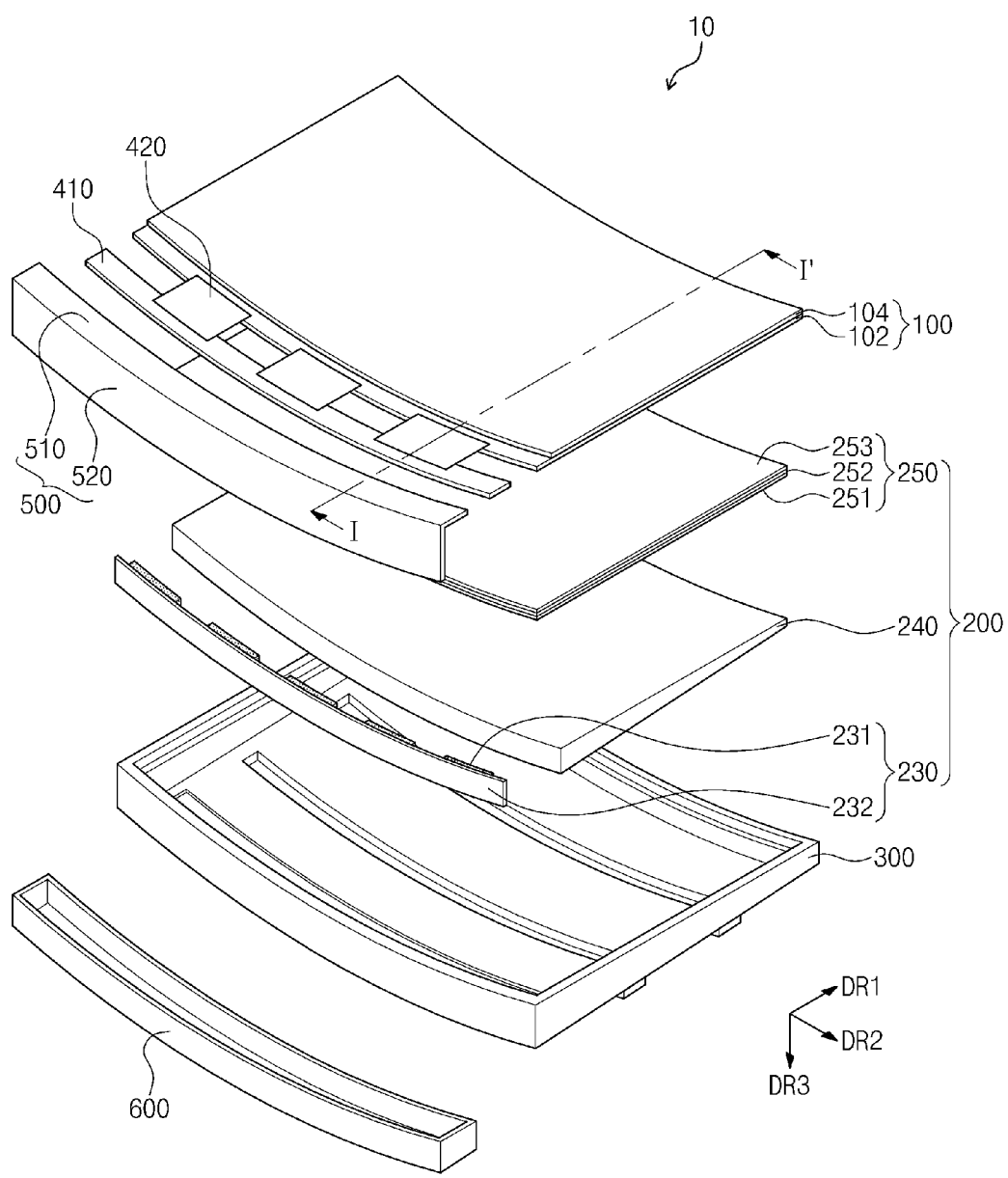
FIG. 5A is an exploded perspective view showing still another exemplary embodiment of a curved display device according to the invention.
Figure 5B:
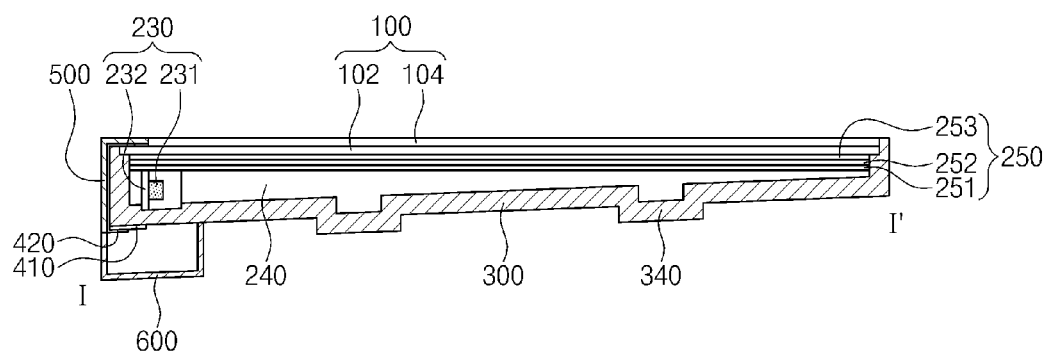
FIG. 5B is a cross-sectional view taken along line I-I' of FIG. 5A.
Figure 5C:
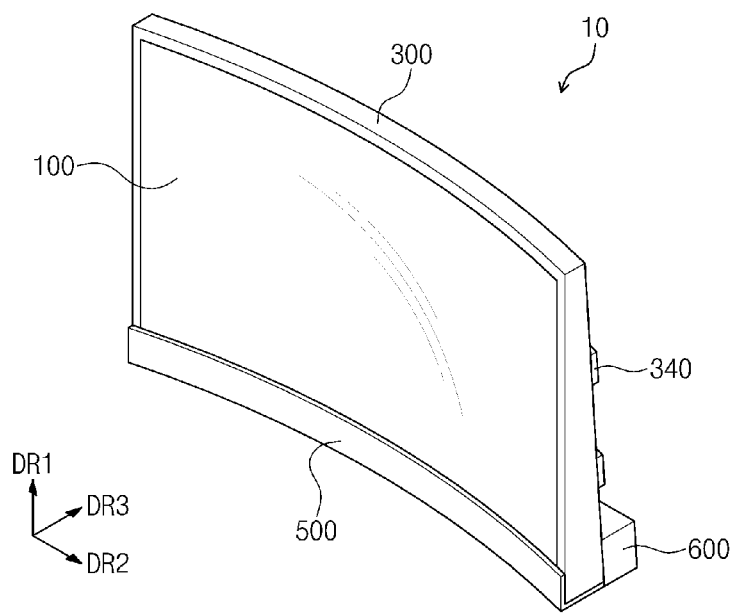
FIG. 5C is a perspective view showing an assembled state of the curved display device in FIGS. 5A and 5B according to the invention.

FIG. 5A is an exploded perspective view showing still another exemplary embodiment of a curved display device according to the invention, FIG. 5B is a cross-sectional view taken along line I-I' of FIG. 5A, and FIG. 5C is a perspective view showing an assembled state of the curved display device in FIGS. 5A and 5B according to the invention.

Referring to FIGS. 4A to 4C and 5A to 5C, the curved display device 10 includes a backlight unit 200, a display panel 100, a bottom chassis 300, a printed circuit board 410, a tape carrier package 420 and a top chassis 500. Hereinafter, different features of the curved display device 10 shown in FIGS. 4A to 4C from those of the curved display device 10 shown in FIGS. 1A to 1C will be mainly described.

As described above, the display panel 100 displays the image. The display panel 100 includes a first display substrate 102 and a second display substrate 104 facing the first display substrate 102. Although not shown in figures, the display panel 100 may include a liquid crystal layer disposed between the first and second display substrates 102 and 104.

Although not shown in figures, a plurality of gate lines extending in a first direction DR1 and a plurality of data lines extending in a second direction DR2 substantially vertical to the first direction DR1 are arranged on a first base substrate of the first display substrate 102. The data lines are insulated from the gate lines while crossing the gate lines. The pixel areas are arranged on the first base substrate of the first display substrate 102 in a matrix form. A thin film transistor includes a gate electrode electrically connected to a corresponding gate line of the gate lines, a source electrode electrically connected to a corresponding data line of the data lines, and a drain electrode electrically connected to a pixel electrode. Accordingly, the thin film transistor switches a signal used to control or drive each pixel area to the pixel electrode.

Although not shown in figures, the second display substrate 104 includes a color filter displaying a predetermined color using the light and a common electrode disposed on the color filter to face the pixel electrode, on a second base substrate. In an alternative exemplary embodiment, the color filter and the common electrode may be disposed on the first base substrate of the first display substrate 102.

The liquid crystal layer (not shown) is disposed between the first and second display substrates 102 and 104. The liquid crystal layer (not shown) includes liquid crystal molecules aligned in a specific direction in response to an electric field generated by voltages respectively applied to the pixel electrode and the common electrode, and thus the liquid crystal layer controls a transmittance of the light provided from the backlight unit 200. As a result, the display panel 100 displays the image.

As described above, the curved display device 10 further includes the printed circuit board 410 electrically connected to the display panel 100 and the tape carrier package 420 connecting the display panel 100 to the printed circuit board 410. The curved display device 10 may further include the top chassis 500 covering at least one of the side surfaces of the display panel 100.

The printed circuit board 410 is electrically connected to the display panel 100. The printed circuit board 410 is disposed on a surface of the bottom chassis 300 such as facing an outer surface of the bottom chassis 300. In an exemplary embodiment, for instance, when viewed from the thickness direction DR3 of the display panel 100, the printed circuit board 410 may be attached to a lower surface (refer to 301 of FIG. 2C) of the bottom chassis 300. The printed circuit board 410 may be curved.

The printed circuit board 410 drives the display panel 100. The printed circuit board 410 includes a driver (not shown) which applies a driving signal to the display panel 100, but should not be limited thereto or thereby. That is, the driver (not shown) may be included in the tape carrier package 420.

The driver (not shown) generates the driving signal to drive the display panel 100 in response to an external signal. The external signal is provided from the printed circuit board 410 and includes signals such as image signals, various control signals and a driving voltage.

Gate and data signals are required to display the image through the display panel 100 and the driver (not shown) includes a data driver (not shown) that converts the image signals to the data signal and applies the data signal to the display panel 100. In an exemplary embodiment, the data driver (not shown) may be mounted on the tape carrier package 420 after being integrated in a chip or mounted on a first base substrate in a chip-on-glass ("COG") scheme.

A gate driver (not shown) generating the gate signal may be directly formed on the first display substrate 102, but should not be limited thereto or thereby. That is, the gate driver (not shown) may be mounted on the tape carrier package 420 or the driver (not shown) after being integrated in a chip.

The printed circuit board 410 may be flexible or rigid. In an exemplary embodiment, for instance, the printed circuit board 410 may be a polymer substrate, a plastic substrate, a glass substrate or a quartz substrate.

The tape carrier package 420 electrically connects the printed circuit board 410 and the display panel 100 to each other. The tape carrier package 420 has a film shape with elasticity. The tape carrier package 420 may be provided in a plural number.

The top chassis 500 covers the tape carrier package 420. The top chassis 500 may be curved. The top chassis 500 includes an upper surface 510 and a side surface 520. The upper surface 510 is overlapped with a portion of the first display substrate 102 and the tape carrier package 420. The side surface 520 is connected to the upper surface 510. The side surface 520 is overlapped with the tape carrier package 420. The top chassis 500 may define the upper surface 510 and the side surface 520 thereof. One of the upper surface 510 and the side surface 520 may extend to define the other one of the upper surface 510 and the side surface 520.

The top chassis 500 is disposed adjacent to the light incident surface 241 (refer to FIG. 3A) rather than being disposed at the opposite surface 242 (refer to FIG. 3A). The top chassis 500 is disposed on at least one side surface of the bottom chassis 300. In an exemplary embodiment, for instance, among the side surfaces of the bottom chassis 300, the top chassis 500 is disposed on one side surface of the bottom chassis 300 and not disposed on the other side surfaces of the bottom chassis 300.

The top chassis 500 includes the same material as that of the bottom chassis 300. In an exemplary embodiment, for instance, the top chassis 500 includes one or a metal and a metal alloy, e.g., aluminum, gold, silver, iron, etc.

A set frame 600 covers the printed circuit board 410 disposed on the lower surface of the bottom chassis 300. The set frame 600 may be curved. The set frame 600 covers the printed circuit board 410 and is overlapped with a portion of the bottom chassis 300. The set frame 600 is disposed closer to the light incident surface 241 (refer to FIG. 3A) than the opposite surface 242 (refer to FIG. 3A).

In FIGS. 4A to 4C and 5A to 5C, the set frame 600 has a hollow shape in which the inside thereof is empty, but should not be limited thereto or thereby. That is, in an alternative exemplary embodiment, the inside of the set frame 600 is filled, e.g., not empty.

Referring to FIGS. 5A to 5C, the bottom chassis 300 may further include a bracket 340 to reinforce rigidity of the bottom chassis 300. The bracket 340 includes the same material as that of the bottom chassis 300. The bottom chassis 300 may define the bracket 340 thereof.

The bracket 340 may not be overlapped with the set frame 600 when viewed in the thickness direction DR3 of the display panel 100. The bracket 340 is spaced apart from the set frame 600.

FIGS. 5A to 5C show two brackets 340, but the number of the brackets 340 should not be limited to two. That is, the number of the brackets 340 may be one or three or more.

In FIGS. 5A to 5C, the bracket 340 lengthwise extends in the second direction DR2, but should not be limited thereto or thereby. That is, the bracket 340 may lengthwise extend in the first direction DR1.

In a conventional curved display device, a light guide plate has a uniform thickness and is curved. However, in one or more exemplary embodiment of the light guide plate of the curved display device according to the invention, the light guide plate has the non-constant thickness and is curved. Accordingly, an overall thickness of the curved display device according to the invention is easily reduced as compared to the conventional curved display device.

In general, since the conventional curved display device includes a set structure (e.g., a mold frame, heat discharge plate, etc.) coupled to side and lower surfaces of the bottom chassis, reducing an overall thickness of the conventional curved display device may be difficult. However, in one or more exemplary embodiment of the curved display device according to the invention, the bottom chassis functions as the mold frame and a heat discharge plate such that the display device does not include a separate set structure, and thus an overall thickness of the curved display device according to the invention may be easily reduced.

Referring to FIGS. 4C and 5C, one or more exemplary embodiment of the curved display device according to the invention may be utilized in an assembled state thereof where the light incident surface is positioned at a lower side when the assembled curved display device is viewed by a user. In an exemplary embodiment, for instance, one or more exemplary embodiment of the curved display device according to the invention may be used as a television set after being assembled with the set frame 600 and the top chassis 500 as supporters at a lower side of the curved display device. Therefore, in one or more exemplary embodiment of the curved display device according to the invention, a separate support member covering all side surfaces of the bottom chassis of a conventional curved display device is obviated. Where the separate support member of the conventional curved display device is omitted, an overall thickness of the curved display device according to the invention is easily reduced.

Hereinafter, the method of manufacturing a curved display device will be described in detail.

Figure 6:
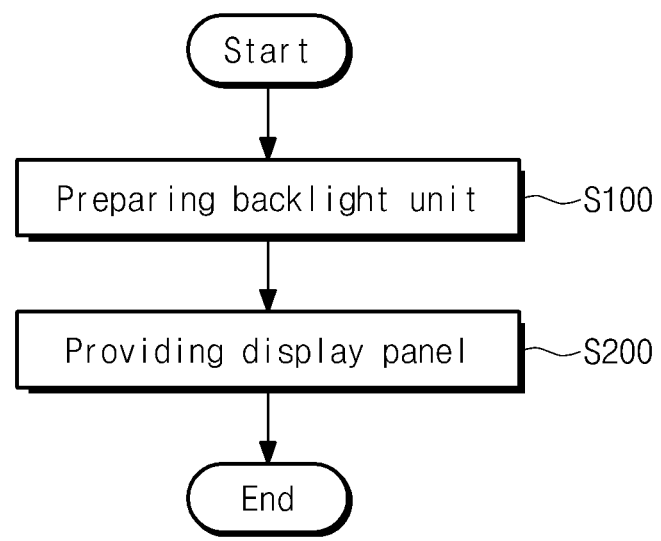
FIG. 6 is a flowchart showing an exemplary embodiment of a method of manufacturing a curved display device according to the invention.

FIG. 6 is a flowchart showing an exemplary embodiment of a method of manufacturing a curved display device according to the invention.

Referring to FIGS. 1A to 1C, 3A, 4A to 4C, 5A to 5C and 6, the manufacturing method of the curved display device includes preparing the backlight unit 200 (S100) and providing the display panel 100 on the backlight unit 200 (S200).

The preparing of the backlight unit 200 (S100) includes preparing the light guide plate 240 including the light incident surface 241 and the opposite surface 242 and having the thickness decreasing from the light incident surface 241 to the opposite surface 242. The preparing of the backlight unit 200 (S100) may further include providing the light source unit 230 and providing the optical member 250 on the light source unit 230.

The light guide plate 240 prepared in the (S100) defines the light incident surface 241 thereof and the opposite surface 242 thereof. The thickness of the light guide plate 240 decreases as the distance to the opposite surface 242 decreases. The thickness of the light guide plate 240 uniformly decreases as the distance to the opposite surface 242 decreases.

The light incident surface 241 receives the light provided from the light source unit 230. The light incident surface 241 is disposed adjacent to the light source unit 230. The opposite surface 242 faces the light incident surface 241. The opposite surface 242 is spaced apart from the light incident surface 241 in the first direction DR1.

Each of the light incident surface 241 and the opposite surface 242 has the curved rectangular shape. In an exemplary embodiment, for instance, each of the light incident surface 241 and the opposite surface 242 may have a shape corresponding to a portion of a ring. In a cross-section of the light guide plate 240, each of the light incident surface 241 and the opposite surface 242 is defined by curved lines and straight lines.

The light guide plate 240 further defines the first side surface 243 thereof and the second side surface 244 thereof. The first side surface 243 connects the light incident surface 241 and the opposite surface 242 to each other. The second side surface 244 faces the first side surface 243. The second side surface 244 connects the light incident surface 241 and the opposite surface 242 to each other. The second side surface 244 is spaced apart from the first side surface 243 in the second direction DR2.

Each of the first side surface and second side surface 243 and 244 has the trapezoid shape in a cross-section of the light guide plate 240. Each of the first side surface and second side surface 243 and 244 is defined by straight lines.

The light guide plate 240 further defines the light exit surface 246 thereof and the rear surface 247 thereof. The light, which is incident into the light guide plate 240, exits through the light exit surface 246. The rear surface 247 faces the light exit surface 246. The rear surface 247 is spaced apart from the light exit surface 246 in the third direction Dr3. In a cross-section of the light guide plate 240, each of the light exit surface 246 and the rear surface 247 is defined by straight lines. The distance between the light exit surface 246 and the rear surface 247 decreases in the first direction DR1 as the distance from the opposite surface 242 decreases.

The light guide plate 240 is manufactured by an extrusion or injection molding process. In an exemplary embodiment, for instance, the light guide plate 240 may be manufactured by extruding the metal or the metal alloy using a plurality of rollers. As another exemplary embodiment, the light guide plate 240 may be manufactured by injecting the metal or the metal alloy using a mold.

The display panel 100 is disposed on the backlight unit 200 in the providing of the display panel 100 (S200). The display panel 100 receives the light provided by the backlight unit 200 and displays the image. The display panel 100 includes the first display substrate 102 and the second display substrate 104 facing the first display substrate 102. Although not shown in figures, the display panel 100 includes the liquid crystal layer disposed between the first and second display substrates 102 and 104.

The exemplary embodiment of the manufacturing method of the curved display device 10 according to the invention further includes providing the bottom chassis 300. The bottom chassis 300 holds the backlight unit 200 and the display panel 100 within the curved display device 10. The bottom chassis 300 may be curved.

The bottom chassis 300 includes the metal or the metal alloy. In an exemplary embodiment, for instance, the bottom chassis 300 includes one of aluminum, gold, silver and iron. Therefore, the bottom chassis 300 not only holds the display panel 100 to serve as a set structure (e.g., separate mold frame) of a conventional curved display device, but also discharges heat generated from the display panel 100 to serve as a heat dissipating plate of a conventional curved display device. Where the curved display device 10 does not include a separate mold frame, the bottom chassis 300 may serve as the mold frame of the conventional curved display device.

The bottom chassis 300 may have the non-constant thickness. In an exemplary embodiment, for instance, the thickness of the portion of the bottom chassis 300 which is disposed adjacent to the light incident surface 241 of the light guide plate 240, may be greater than the thickness of the portion of the bottom chassis 300 which is disposed adjacent to the opposite surface 242 of the light guide plate 240. The thickness of the bottom chassis 300 is uniformly reduced in the first direction DR1 as the distance from the portion of the bottom chassis 300 which is disposed adjacent to the opposite surface 242 (refer to FIG. 3A) of the light guide plate 240 decreases.

The exemplary embodiment of the manufacturing method of the curved display device 10 according to the invention may further include providing the printed circuit board 410 electrically connected to the display panel 100 and providing the tape carrier package 420 which connects the printed circuit board 410 to the display panel 100.

The printed circuit board 410 is electrically connected to the display panel 100. The printed circuit board 410 is attached to the lower portion of the bottom chassis 300 such as to a lower surface of the bottom chassis 300. The printed circuit board 410 is curved.

The tape carrier package 420 electrically connects the printed circuit board 410 and the display panel 100 to each other. The tape carrier package 420 has the film shape with elasticity. The tape carrier package 420 may be provided in a plural number.

The exemplary embodiment of the manufacturing method of the curved display device 10 may further include providing the top chassis 500. The top chassis 500 covers at least one of the side surfaces of the display panel 100.

The top chassis 500 covers the printed circuit board 410 and the tape carrier package 420 which are connected to the display panel 100. The top chassis 500 may be curved. The top chassis 500 is disposed on at least one side surface of the bottom chassis 300. In an exemplary embodiment, for instance, among the side surfaces of the bottom chassis 300, the top chassis 500 is disposed on one side surface of the bottom chassis 300 and not disposed on the other side surfaces of the bottom chassis 300.

The top chassis 500 includes the same material as that of the bottom chassis 300. In an exemplary embodiment, for instance, the top chassis 500 includes the metal or the metal alloy, e.g., aluminum, gold, silver, iron, etc.

The exemplary embodiment f the manufacturing method of the curved display device 10 may further include providing the set frame 600. The set frame 600 covers the printed circuit board 410. The set frame 600 may be curved. The set frame 600 covers the printed circuit board 410 and is overlapped with the portion of the bottom chassis 300. The set frame 600 is overlapped with the light incident surface 241 and not overlapped with the opposite surface 242.

In the conventional curved display device manufactured by a conventional manufacturing method, the light guide plate has the uniform thickness and is curved. However, in one or more exemplary embodiment of manufacturing the curved display device according to the invention, the light guide plate is provided to have the non-constant thickness and is curved. Accordingly, the curved display device manufactured by one or more exemplary embodiment according to the invention easily reduces an overall thickness of the curved display device as compared to a manufacturing method of the conventional curved display device.

In general, since the manufacturing method of the conventional curved display device includes providing the separate set structure (e.g., mold frame, heat dissipating plate) coupled to the side and lower surfaces of the bottom chassis, reducing an overall thickness of the conventional curved display device is difficult. However, one or more exemplary embodiment of manufacturing the curved display device according to the invention, the bottom chassis is provided to be integrally formed to function as a set structure such as the mold frame and the heat discharge plate and a separate set structure is obviated. Since providing the separate set structure is obviated, an overall thickness of the curved display device according to the invention is easily reduced.

Referring to FIGS. 4C and 5C, the curved display device manufactured by one or more exemplary embodiment of the manufacturing method according to the invention may be utilized in an assembled state thereof where the light incident surface to be positioned at the lower side when the assembled curved display device is viewed by a user. In an exemplary embodiment, for instance, the curved display device manufactured by one or more exemplary embodiment of the method according to the invention may be used as the television set after being assembled using the set frame and the top chassis as supporters at a lower side of the curved display device. Therefore, the curved display device manufactured by one or more exemplary embodiment of the method according to the present invention does not require the separate support member covering all side surfaces of the bottom chassis of a conventional curved display device. Where the separate support member of the conventional curved display device is omitted, an overall thickness of the curved display device according to the invention is easily reduced.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A curved display device comprising:
   a curved backlight unit comprising:
      a light source which generates light; and
      a curved light guide plate which receives the light from the light source, the curved light guide plate defining:
         a light incident surface which faces the light source, the light incident surface curved along a first direction when viewed from the light source; and
         an opposite surface facing the light incident surface in a second direction crossing the first direction,
         wherein a thickness of the curved light guide plate decreases along the second direction from the curved light incident surface to the opposite surface;
   a curved display panel which is disposed on the curved backlight unit and receives the light generated by the curved backlight unit to display an image; and
   a curved bottom chassis on which the curved backlight unit and the curved display panel are supported, the curved bottom chassis curved in the first direction along which the light incident surface of the curved light guide plate is curved, wherein a thickness of the curved bottom chassis decreases along the second direction from the curved light incident surface of the curved light guide plate to the opposite surface thereof.

2. The curved display device of claim 1, wherein the thickness of the curved light guide plate uniformly decreases from the light incident surface to the opposite surface.

3. The curved display device of claim 1, wherein the curved light guide plate further defines:
   a first side surface thereof connecting the light incident surface and the opposite surface to each other; and
   a second side surface thereof spaced apart from the first side surface in the first direction, the second side surface connecting the light incident surface and the opposite surface to each other,
wherein each of the first side surface and the second side surface has a trapezoid shape.

4. The curved display device of claim 3, wherein the curved light guide plate further defines:
a light exit surface thereof from which the light incident to the light guide plate exits; and
a rear surface thereof facing the light exit surface, and each of the light exit surface and the rear surface at the first side surface and at the second side surface, respectively, is a straight line.

5. The curved display device of claim 3, wherein the first side surface has a same surface area as that of the second side surface.

6. The curved display device of claim 1, wherein the curved light guide plate further defines:
a light exit surface thereof from which the light incident to the light guide plate exits; and
a rear surface thereof facing the light exit surface, and at each of the light incident surface and the opposite surface, each of light exit surface and the rear surface is a curved line.

7. The curved display device of claim 1, wherein the light incident surface has a surface area greater than that of the opposite surface.

8. The curved display device of claim 1, wherein the curved light guide plate further defines:
a light exit surface thereof from which the light incident to the light guide plate exits; and
a rear surface thereof facing the light exit surface,
wherein in the second direction, a distance between the light exit surface and the rear surface decreases from the light incident surface to the opposite surface.

9. The curved display device of claim 8, wherein an angle between the light exit surface and the rear surface is in a range from about 0.1 degree to about 0.3 degree.

10. The curved display device of claim 8, wherein at least one of the light exit surface and the rear surface has a lenticular shape or a prism shape.

11. The curved display device of claim 1, wherein the curved light guide plate comprises a light scattering agent.

12. The curved display device of claim 1, wherein in the first direction in which the light incident surface is curved, the curved display panel has a first radius of curvature and the curved backlight unit has a second radius of curvature different from the first radius of curvature.

13. The curved display device of claim 1, the curved bottom chassis comprises a metal or a metal alloy.

14. The curved display device of claim 13, further comprising:
a printed circuit board which is electrically connected to the curved display panel; and
a tape carrier package which connects the curved display panel and the printed circuit board to each other.

15. The curved display device of claim 14, further comprising a top chassis which covers at least one side surface of the curved display panel.

16. The curved display device of claim 15, wherein the printed circuit board is disposed on a lower surface of the curved bottom chassis and the top chassis overlaps a portion of the tape carrier package connected to the printed circuit board.

17. The curved display device of claim 15, wherein the top chassis is disposed adjacent to the light incident surface of the curved light guide plate.

18. The curved display device of claim 14, further comprising a set frame which covers the printed circuit board and overlaps a portion of the curved bottom chassis.

19. The curved display device of claim 18, wherein the set frame is disposed adjacent to the light incident surface of the curved light guide plate.

20. The curved display device of claim 18, wherein the curved bottom chassis defines a bracket which protrudes from a lower surface of the curved bottom chassis, wherein the bracket reinforces rigidity of the curved bottom chassis and is spaced apart from the set frame.

21. A method of manufacturing a curved display device, comprising:
preparing a curved backlight unit which generates light;
providing a curved display panel which displays an image with the light, on the curved backlight unit; and
preparing a curved bottom chassis on which the curved backlight unit and the curved display panel are supported,
the preparing the curved backlight unit comprising preparing a curved light guide plate defining a light incident surface thereof and an opposite surface thereof which opposes the light incident surface, the light incident surface curved along a first direction, wherein a thickness of the curved light guide plate decreases in a second direction defined from the curved light incident surface to the opposite surface, and
the preparing the curved bottom chassis comprising curving the curved bottom chassis in the first direction along which the light incident surface of the curved light guide plate is curved, wherein a thickness of the curved bottom chassis decreases along the second direction defined from the curved light incident surface of the curved light guide plate to the opposite surface thereof.

22. The method of claim 21, wherein the curved light guide plate is manufactured by an extrusion process or injection molding process.

23. A curved display device comprising:
a curved backlight unit comprising:
a light source which generates light; and
a light guide plate having a curved wedge shape, the light guide plate comprising a first side surface curved along a first direction, the first side surface facing the light source;
a curved display panel which is disposed on the curved backlight unit and receives the light generated by the curved backlight unit to display an image; and
a curved bottom chassis on which the curved backlight unit and the curved display panel are supported, the curved bottom chassis curved in the first direction along which the first side surface of the light guide plate is curved,
wherein with the first side surface of the curved light guide plate curved in the first direction,
a thickness of the curved backlight unit decreases in a second direction defined from the curved first side surface to a second side surface opposite thereto in the second direction, and
a thickness of the curved bottom chassis decreases in the second direction defined from the curved first side surface to the second side surface opposite thereto in the second direction.

24. A curved display device comprising:
a curved backlight unit which generates light and comprises a curved light guide plate, the curved backlight unit comprising:

a light source unit which generates the light;

a first side surface at which the light source is disposed, the first side surface curved along a first direction; and a second side surface facing the first side surface in a second direction crossing the first direction;

a curved display panel which is disposed on the curved backlight unit and receives the light generated by the curved backlight unit to display an image; and a curved bottom chassis on which the curved backlight unit and the curved display panel are supported, the curved bottom chassis curved in the first direction along which the first side surface of the curved backlight unit is curved, wherein with the first side surface of the curved backlight unit curved along the first direction, an overall thickness of the curved backlight unit decreases along the second direction defined from the curved first side surface to the second side surface, and a thickness of the curved bottom chassis decreases in the second direction defined from the curved first side surface to the second side surface.

* * * * *